United States Patent
Chapman et al.

(10) Patent No.: US 7,083,179 B2
(45) Date of Patent: Aug. 1, 2006

(54) RUNNING BOARD

(75) Inventors: Timothy W. Chapman, Etobicoke (CA); Changize Sadr, North York (CA); Franz Gangl, King City (CA); Adrian Stanescuc, Georgetown (CA)

(73) Assignee: Salflex Polymers Ltd., Weston (CA)

( * ) Notice: Subject to any disclaimer, the term of this patent is extended or adjusted under 35 U.S.C. 154(b) by 123 days.

(21) Appl. No.: 10/376,452

(22) Filed: Mar. 3, 2003

(65) Prior Publication Data
US 2004/0173987 A1   Sep. 9, 2004

(51) Int. Cl.
*B60R 3/00* (2006.01)
(52) U.S. Cl. ............................ 280/163; 224/545
(58) Field of Classification Search ............... 280/163, 280/164.1, 166, 169; D12/203; 248/200, 248/229.25, 231.71, 674; 224/545, 564
See application file for complete search history.

(56) References Cited

U.S. PATENT DOCUMENTS

| | | | | |
|---|---|---|---|---|
| 890,963 | A * | 6/1908 | Coffin | 280/163 |
| 5,193,829 | A * | 3/1993 | Holloway et al. | 280/163 |
| 5,895,064 | A * | 4/1999 | Laubach | 280/163 |
| 6,375,207 | B1 * | 4/2002 | Dean et al. | 280/166 |
| 6,412,799 | B1 * | 7/2002 | Schrempf | 280/163 |
| 6,533,302 | B1 * | 3/2003 | Scruggs et al. | 280/163 |
| 6,588,782 | B1 * | 7/2003 | Coomber et al. | 280/163 |
| 6,592,135 | B1 * | 7/2003 | Hendrix | 280/164.1 |
| 6,612,595 | B1 * | 9/2003 | Storer | 280/163 |
| 6,688,621 | B1 * | 2/2004 | Benirschke | 280/163 |

OTHER PUBLICATIONS

Lanoue et al., US Patent Application Publication US 2003/0006576 A1, Jan. 9, 2003.*

* cited by examiner

*Primary Examiner*—Christopher P. Ellis
*Assistant Examiner*—Christopher Bottorff
(74) *Attorney, Agent, or Firm*—Bereskin & Parr (57) ABSTRACT

A running board for a vehicle such as a truck is mounted to the vehicle body using a C-shaped mounting bracket. The bracket has an open clearance area to accommodate air conditioning conduits or other similar structure adjacent the vehicle body. The running board may include pivotable end caps which may be pivoted to lie parallel with the support surface of the running board and overlying front or rear vehicle fenders. Mounting bolts for the end cap may pass through the running board body of the vehicle fender and the vehicle body.

36 Claims, 10 Drawing Sheets

RUNNING BOARD

FIELD OF THE INVENTION

This invention relates to a method and apparatus for securing a running board to the rocker panel of a motor vehicle. In particular, the invention relates to the method of securing such a running board to a motor vehicle bearing in mind other constraints of the support system namely the need to avoid other structure which may be part of the motor vehicle at the desired support locations.

Many motor vehicles which are mounted on a large wheels and tires or have raised suspension systems, have a vehicle floor which is well above the road surface on which the vehicle travels. Many such vehicles are provided with a step to facilitate entry into the vehicle. These are often referred to as a running board. Typically, running boards are used on trucks, sport utility vehicles and the like The running board provides a structural step which projects outwardly from the rocker panel area of the vehicle and gives enough supporting surface area to support the foot of a person desiring entry into the vehicle. The running board may be a separate structure from the rocker panel and requires structural support to support the load of the person standing on the running board when entering or leaving the vehicle.

In some cases the running board can be bolted directly to a rocker panel at a convenient flange. However, in other cases, because of other clearance requirements within the vehicle which may or may not have a frame, there is other structure which extends along the length of the vehicle running adjacent to the running board. This structure could include fluid lines for carrying different fluids such as gasoline, oil, brake fluid, air conditioning fluids and the like. Where such structure exists, there is a need to provide a mounting system for a running board so that the running board can be mounted to the truck.

BACKGROUND OF THE INVENTION

In most such vehicles, the running board extends along the length of the rocker panel. The running board typically extends the entire length of the rocker panel. For aesthetic and other reasons, it is often desired that the running boards extend forwardly of the rocker panel to overlap the front fender and in some cases, also extend rearwardly of the rocker panel to extend adjacent to the rear fender or other body structure immediately aft of the rocker panel. If the running board overlaps either the front or rear fender structure then the fender mounting assembly must be done before the running board is installed. This order of assembly may not be desirable. This means that the running board must be capable of a finished assembly to the vehicle after the front and rear fenders have been mounted to the vehicle.

It is generally desirable in the automotive industry to create sub assemblies which may be made by suppliers. As many parts as possible are included in the subassembly. The subassembly can then be finish-assembled as needed and the subassembly fitted to the motor vehicle as it is assembled in an automotive assembly plant.

While running boards have conveniently been manufactured from materials having the necessary structural strength such as steel and the like, there are manufacturing advantages to making such products from plastics and there are additional economies to be realized by using the blow molding process. Accordingly, there is a need for improved running board support structure and running board assemblies which can meet the vehicle assembly and clearance requirements as outlined above.

SUMMARY OF THE INVENTION

In accordance with this invention, there is a bracket for mounting a running board to a vehicle. The bracket has a body. The body has at least first and second mounting flanges and a third mounting flange located between the first and second mounting flange. The body of the bracket includes a substantially "C" shaped portion between the first and third mounting flanges. The "C" shaped portion defines an open clearance area. In accordance with a further embodiment of the invention, the body of the bracket includes an extension arm between the third and second mounting flanges. The extension arm may extend from the third mounting flange toward the second mounting flange away from the open clearance area.

In accordance with a further embodiment of the invention, the invention includes an assembly comprising a bracket as explained above in combination with a running board. The running board includes a supporting surface and a mounting surface. The mounting surface includes a first running board mounting pad, a mounting receptacle and a first fastener. The fastener extends through the second mounting flange of the bracket and into the mounting receptacle so that the second flange of the bracket contacts the first running board mounting pad. In accordance with a preferred embodiment of this aspect of the invention, the assembly includes a plurality of such brackets.

In accordance with a further aspect of the invention, the assembly of the running board and at least one bracket as outlined above, further includes, a running board with a central portion and at least one end cap. In a preferred embodiment of this aspect of the invention, the end cap is adapted to pivot with respect to the central portion of the running board between a non-aligned position and an aligned position.

In a further aspect of the invention, there is provided a motor vehicle, the motor vehicle having a rocker panel assembly, the rocker panel assembly including an inner rocker panel and an outer rocker panel and an assembly of a running board and at least one bracket as explained above. In a preferred embodiment of this aspect of the invention, the inner rocker panel includes at least a first inner rocker panel mounting pad. The running board includes a second running board mounting pad and the second running board mounting pad and the first inner rocker panel mounting pad are aligned to receive a second fastener. In a further preferred embodiment of this aspect of the invention, the outer rocker panel includes an outer rocker panel mounting pad and the outer rocker panel mounting pad is aligned with the second running board mounting pad and the first inner rocker panel mounting pad to receive the second fastener. In a further aspect of the invention, the motor vehicle includes an inner rocker panel which includes a second inner rocker panel mounting pad and the second inner rocker panel mounting pad is aligned with the first bracket mounting flange to receive a third fastener.

Various other aspects and objects of the invention may be understood from reference to the following description of preferred embodiments of the invention and the following drawings.

DETAILED DESCRIPTION OF THE INVENTION

Figure 1:
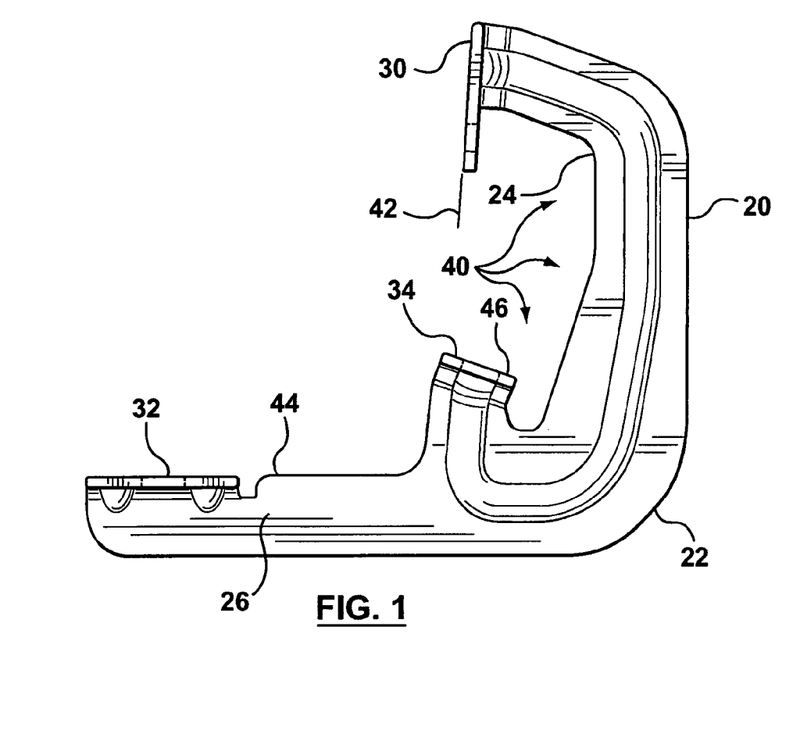
FIG. 1 is a side view of a bracket in accordance with a first embodiment of the invention.
Figures 2, 3:
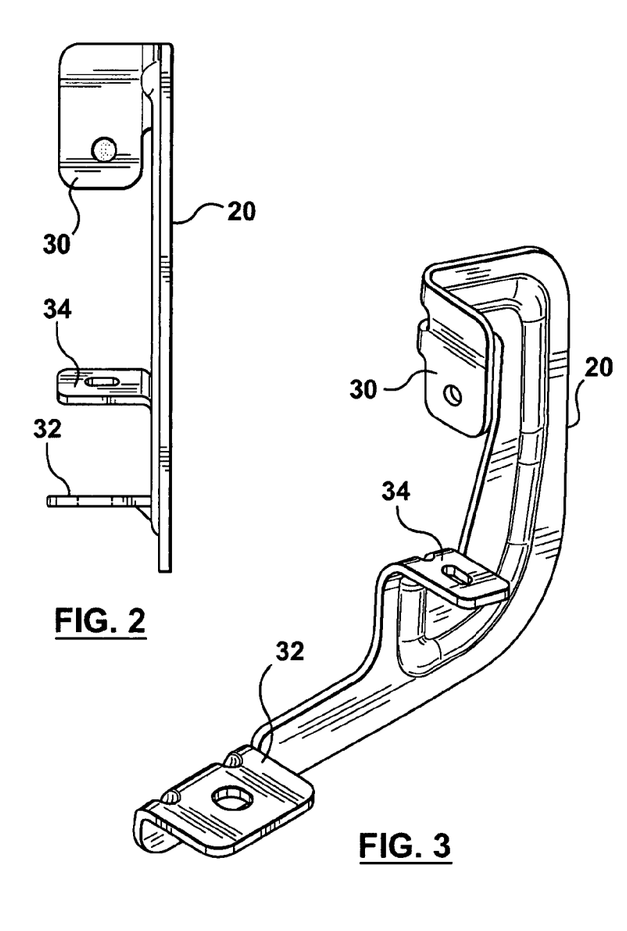
FIG. 2 is a rear view of the bracket of FIG. 1.
FIG. 3 is a perspective view of the bracket of FIG. 1.

FIGS. 1, 2 and 3 illustrate a mounting bracket (20). The mounting bracket 20 includes a body 22. The body 22 includes a C-shaped portion 24 and an extension arm 26. The body 22 of the bracket 20 includes a first mounting flange 30 at one end, a second mounting flange 32 at the opposite end of the body. There is also a third mounting flange 34 located intermediate the first mounting flange 30 and the second mounting flange 32.

The body 22 defines the C-shaped portion 24 extending between the first mounting flange 30 and the third mounting flange 34. The open area of the C-shaped portion is shown as an open clearance area 40 indicated by the three arrows extending to the perimeter of the clamp from a central location.

The first mounting flange is a generally planar flange having a general plane illustrated by the dotted line 42 shown in FIG. 1. The second mounting flange 32 is also a substantially planar flange as illustrated by the dotted line 44 shown in FIG. 1. The plane 42 of the first mounting flange 30 is substantially at right angles to the plane 44 of the second mounting flange 32. The third mounting flange 34 is also substantially planar, the plane being shown by the dotted line 46. The plane 46 is orientated at a slight angle to the plane 42 of the first mounting flange 30.

Figure 4:
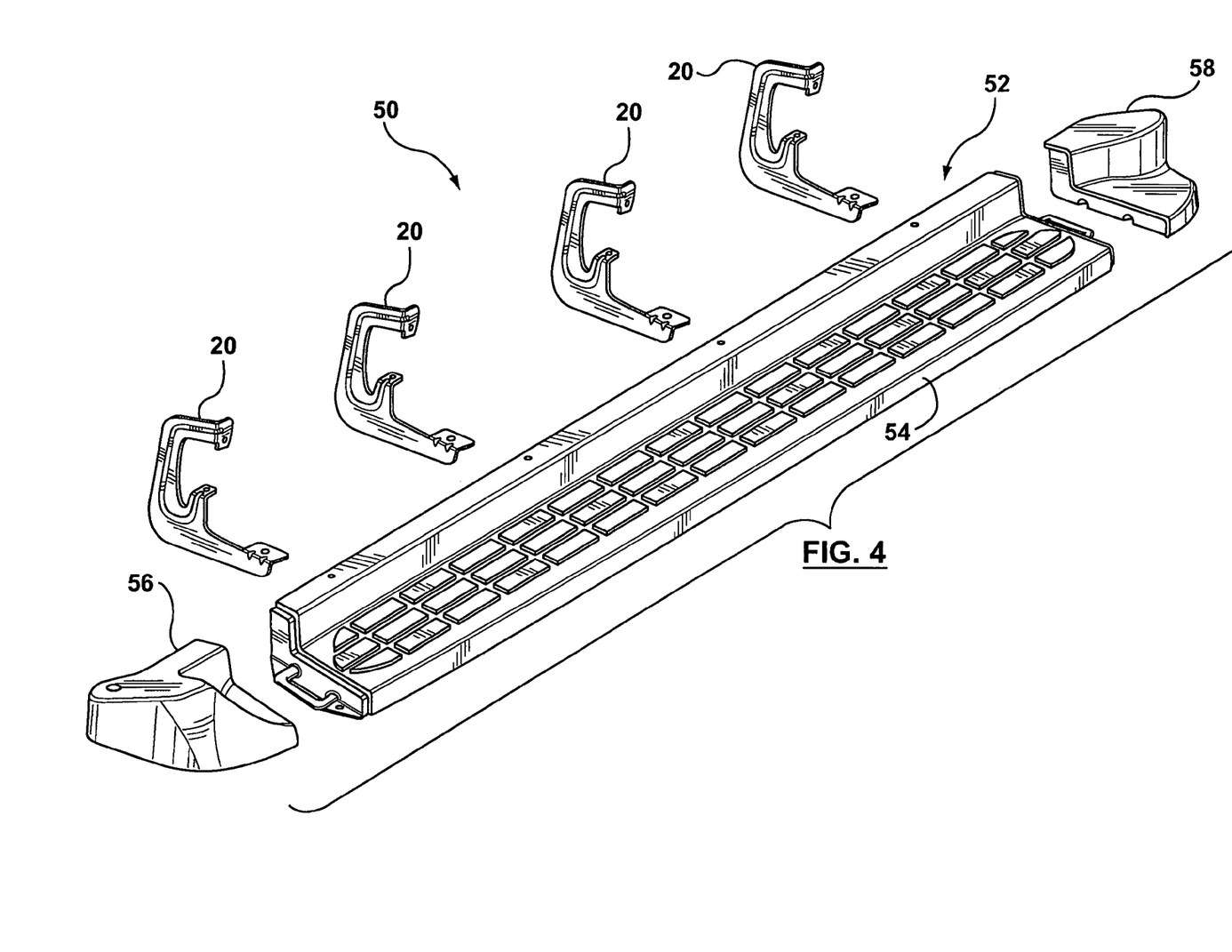
FIG. 4 is an exploded view of a first embodiment of an assembly in accordance with the invention utilizing a plurality of brackets in accordance with FIG. 1.
Figure 5:
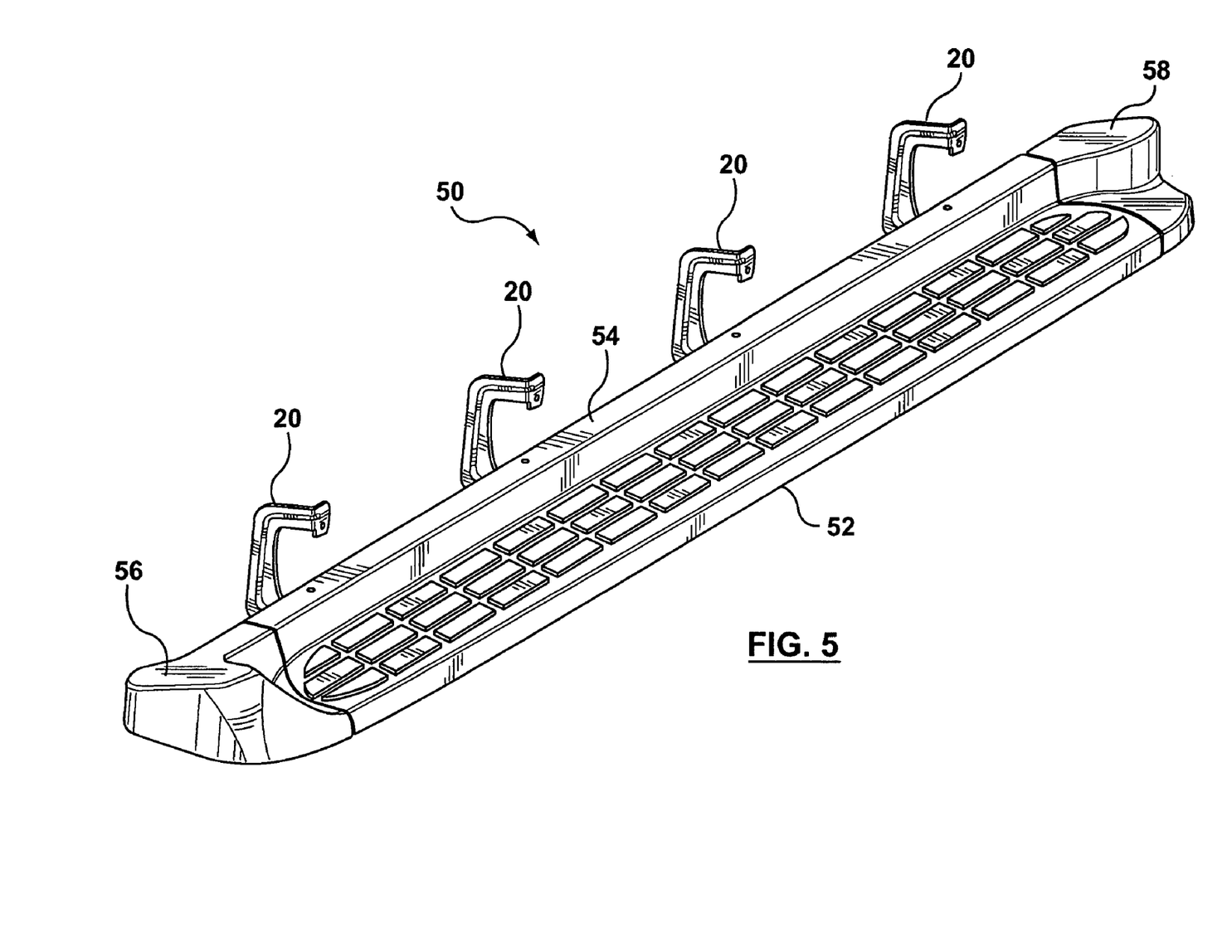
FIG. 5 is a top perspective view of the assembly of FIG. 4 in assembled condition.
Figure 6:
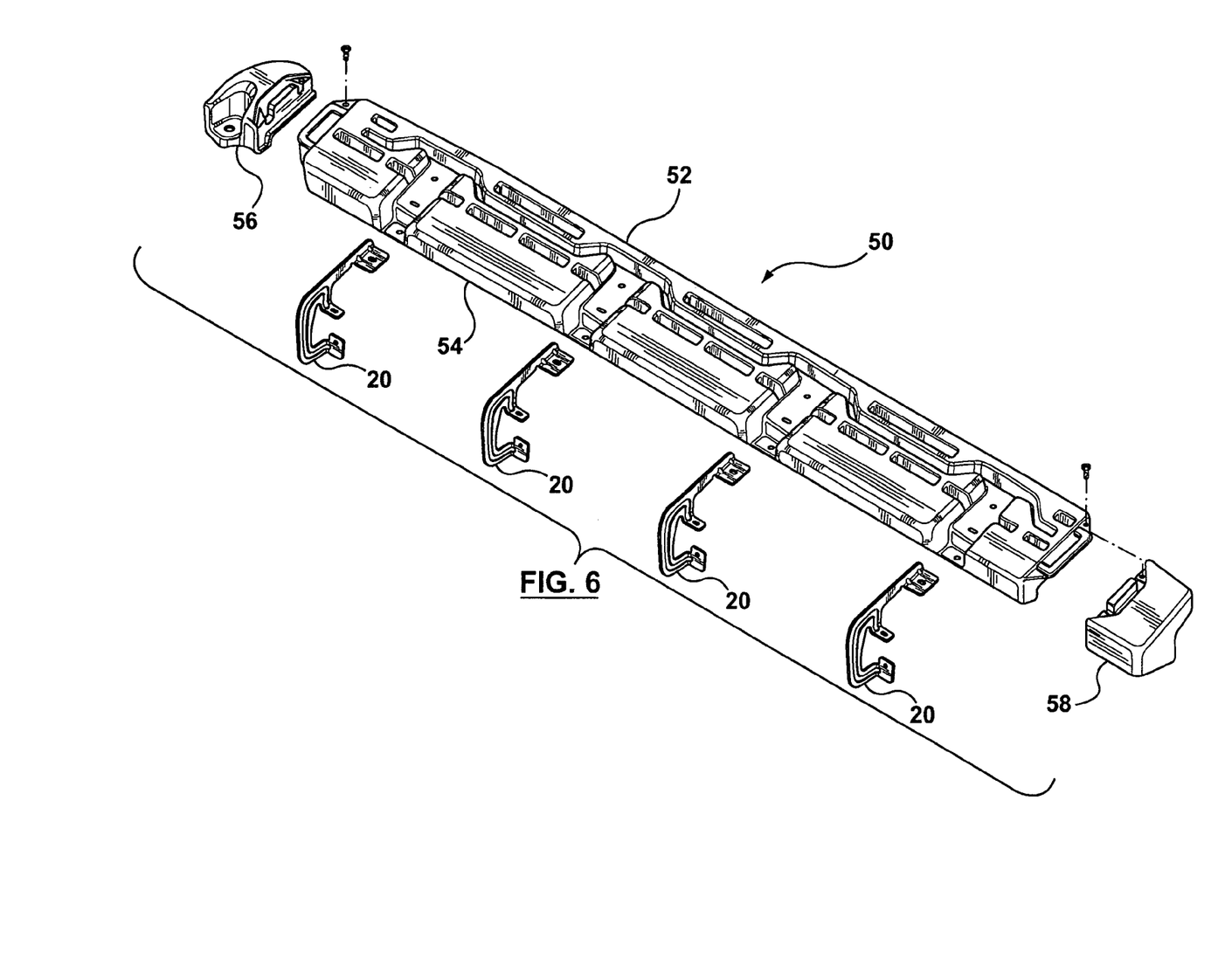
FIG. 6 is a bottom exploded view of the assembly of FIG. 4.
Figure 7:
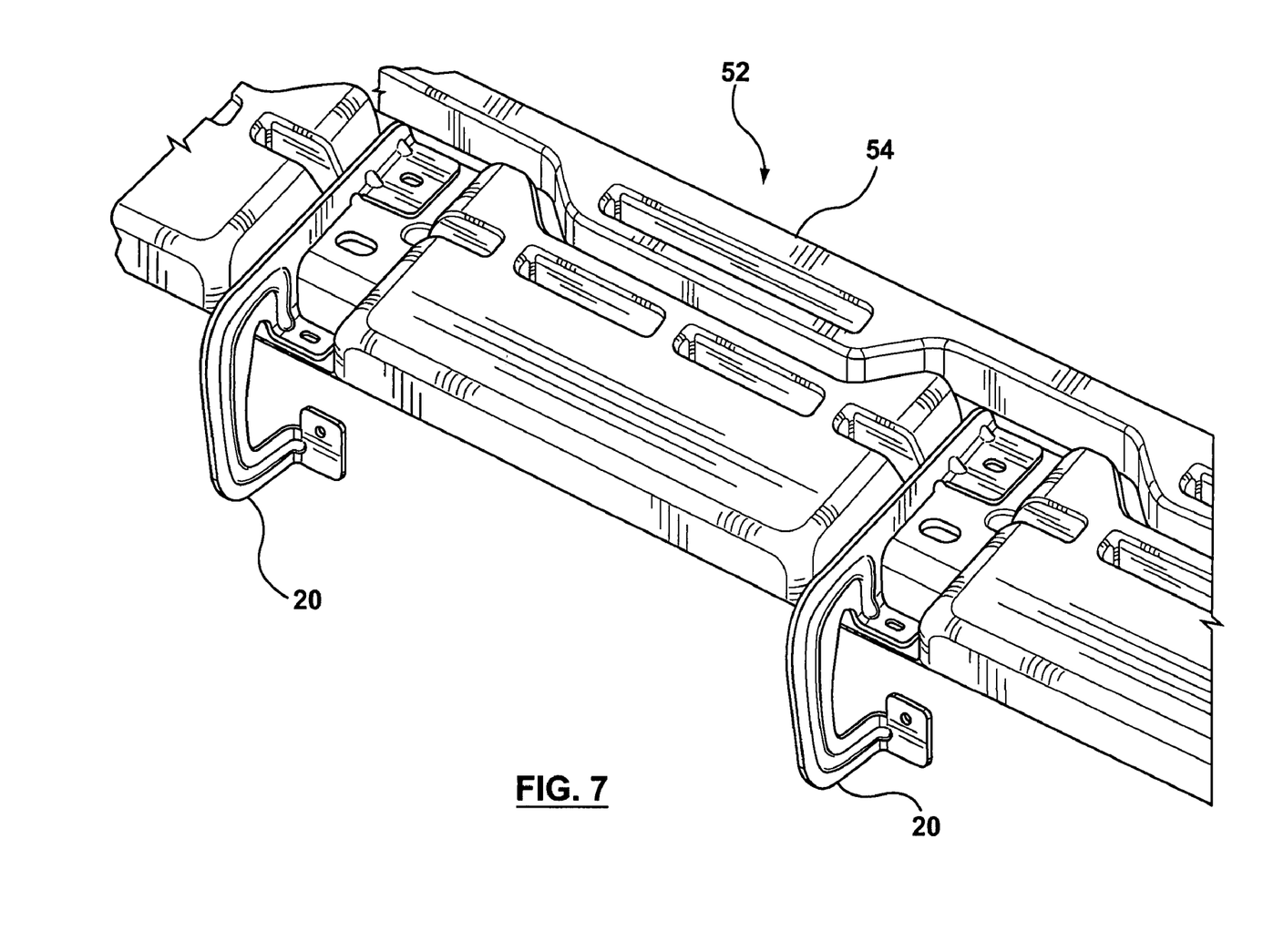
FIG. 7 is an enlarged view of the assembly of FIG. 4 showing two brackets in accordance with FIG. 1 ready for mounting.

FIG. 4 illustrates an exploded running board assembly indicated generally at 50. The running board assembly 50 includes a running board 52 having a central portion 54 and two end caps 56 and 58. The assembly also comprises four brackets 20 which are the same as illustrated in FIGS. 1, 2 and 3. FIG. 5 illustrates the assembly of FIG. 4 in the assembled condition. FIG. 6 illustrates the assembly 50 in exploded condition from the bottom. FIG. 7 illustrates a portion of the running board 52 showing a portion of the central portion 54 of the running board and two of the brackets 20 which have been placed in place ready to be secured by first fasteners to the running board 52.

Figure 8:
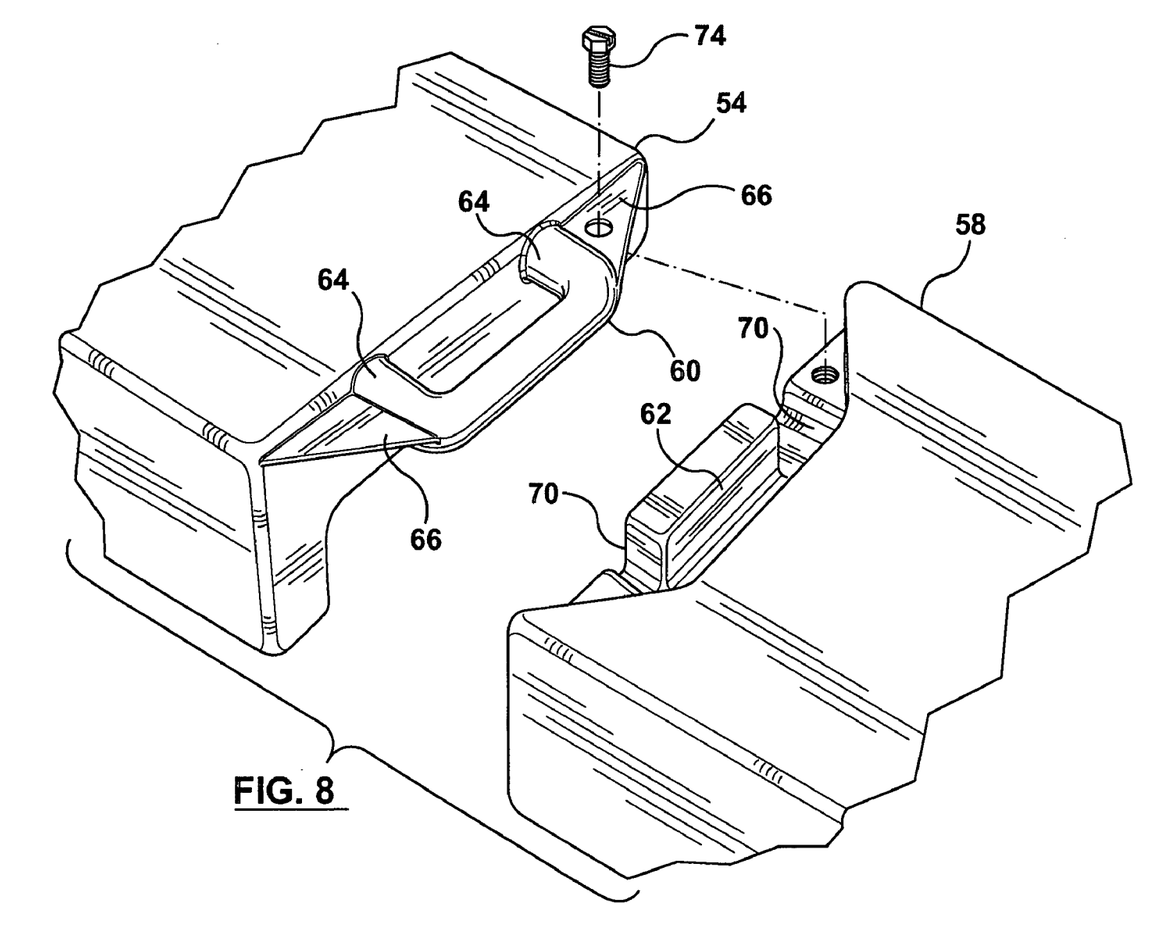
FIG. 8 is an expanded detailed view of portions of two of the components of the assembly of FIG. 4.

FIGS. 8, 9 and 10 illustrate a particular feature of the running board 52. As shown in FIG. 8, the central portion 54 of the running board 52 includes a mounting axle 60 at an end. The end cap 58 includes a mounting groove 62 for receiving the mounting axle 60. FIG. 8 is a bottom view. The mounting axle 60 is supported on a pair of studs 64 and further supported by a pair of gussets 66. The mounting groove 62 of the end cap 58 includes a pair of longitudinally extending sections 70. With respect to FIGS. 9a through 9d, it will be appreciated that the end cap 58 can be assembled to the central portion 54 to form the running board 52 by passing the end cap 58 toward the mounting axle 60 so that the mounting axle 60 is received within the mounting groove 62. The mounting groove 62 includes a recess 72. The recess 72 extends around just over 180° and is a part circular recess. Thus, the mounting axle 60 is received within the recess 72 in a snap fit. Once the snap fit assembly has been performed, the end cap 58 is retained as shown in FIG. 9b. As shown in FIG. 9b, the end cap is in a first or non-aligned position.

Figure 9A:
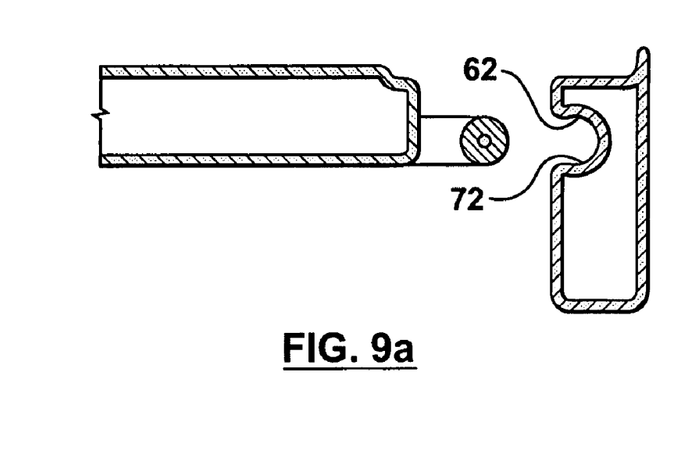
FIG. 9a is a cross-sectional view illustrating the interreaction of the two components shown in FIG. 4a in a first preassembly condition.
Figure 9B:
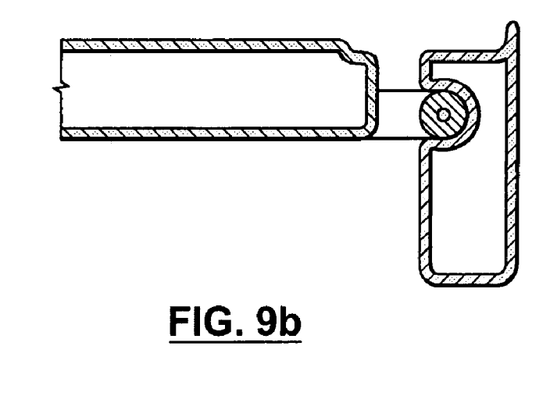
FIG. 9b is similar to FIG. 9a showing the two components in a non-aligned position.
Figure 9C:
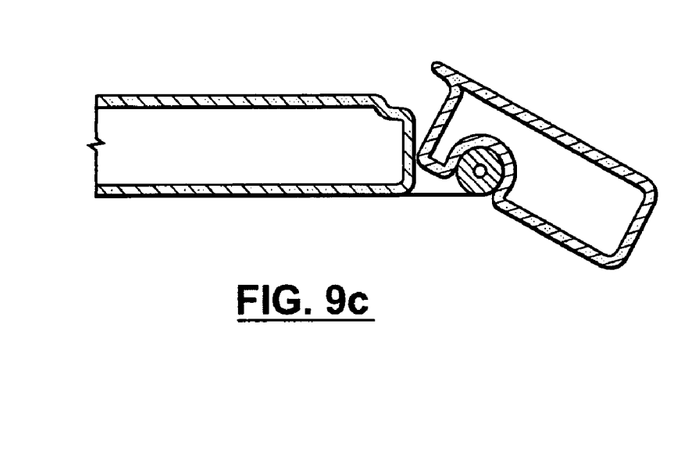
FIG. 9c is similar to FIG. 9b showing the two components being moved toward a second position.
Figure 9D:
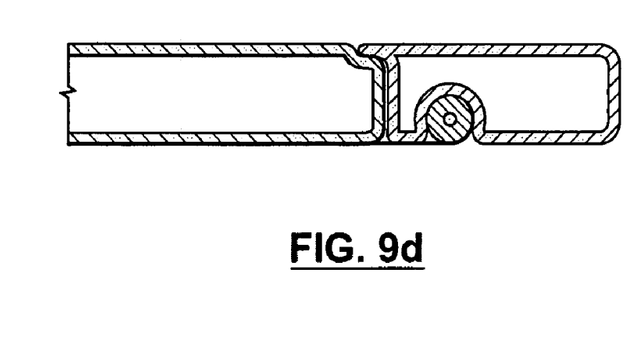
FIG. 9d is similar to FIG. 9c showing the two components in an aligned position.

When desired, as will be more fully explained below, the end cap 58 may be rotated about the amounting axle 60 as shown in FIG. 9c. Rotation continues for 90° until the end cap 58 is in a second or aligned position as shown in FIG. 9d. In the case of the end cap 58 as shown in FIG. 8, the end cap 58 can be maintained in the aligned position shown in FIG. 9d by passing a fastener through one of the gussets 66 where the fastener can be received into a hole within the end cap. The fastener prevents any rotation of the end cap back to the non-aligned position. End cap 56 is similar to end cap 58 but has additional features discussed below.

Figure 10A:
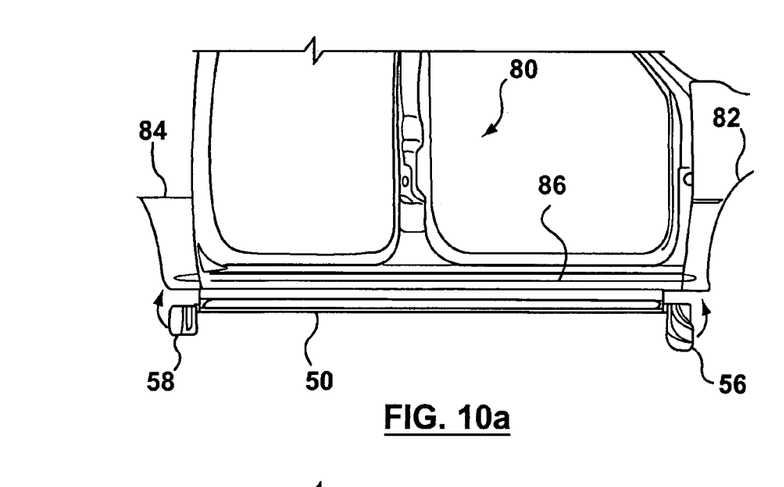
FIG. 10a shows a portion of a vehicle with the assembly of FIG. 4 in an initial position similar to FIG. 9b.
Figure 10B:
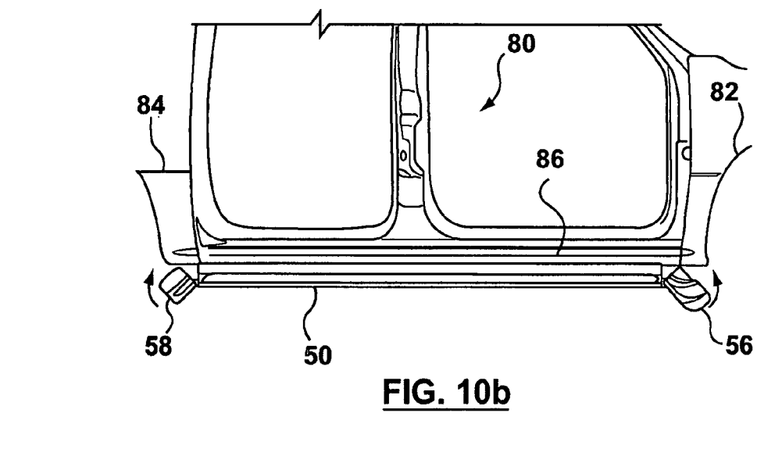
FIG. 10b is the components of FIG. 10a being rotated toward a final position.
Figure 10C:
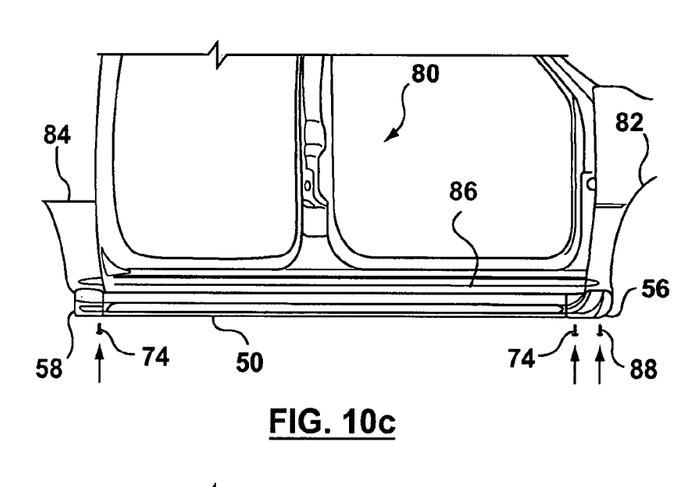
FIG. 10c shows the components of FIG. 10b rotated to the final position and illustrating the placement of fasteners.
Figure 10D:
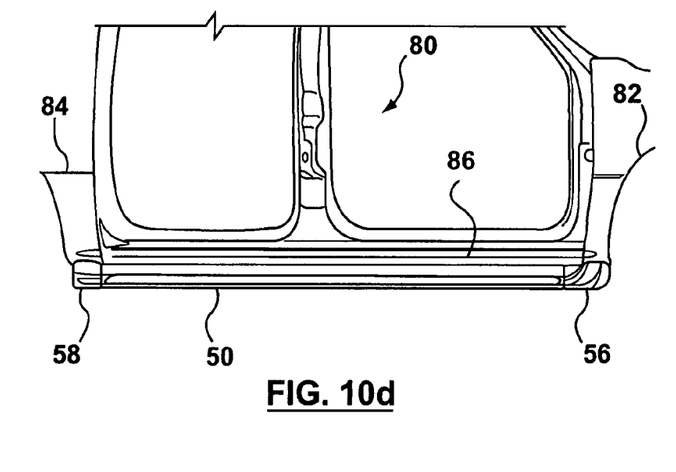
FIG. 10d illustrates the finished assembly of FIG. 4 when assembled to the vehicle.

One of the features of this structure is illustrated by reference to FIGS. 10a through 10d. FIG. 10a shows a portion of a truck body 80. The truck body 80 includes a front fender 82 and a rear fender 84. Extending between the front fender 82 and the rear fender 84 there is a rocker panel assembly 86. In FIG. 10a, the vehicle includes the running board assembly 50. The end caps 56 and 58 have been mounted to the central portion 54 of the running board 52 in the non-aligned position corresponding to FIG. 9b. FIG. 10b shows the rotation of the two end caps from the non-aligned position toward the aligned position. This figure is similar to FIG. 9c. FIG. 10c shows the two end caps 56 and 58 having been rotated to the aligned position similar to the view shown in FIG. 9d. As shown in FIG. 10c a fastener 74 may be used to hold the rear end cap 56 in place. In the case of the front fender, a fastener 74 and a second fastener 88, explained more fully below, are used to hold the front end cap 56 in place.

Figure 11:
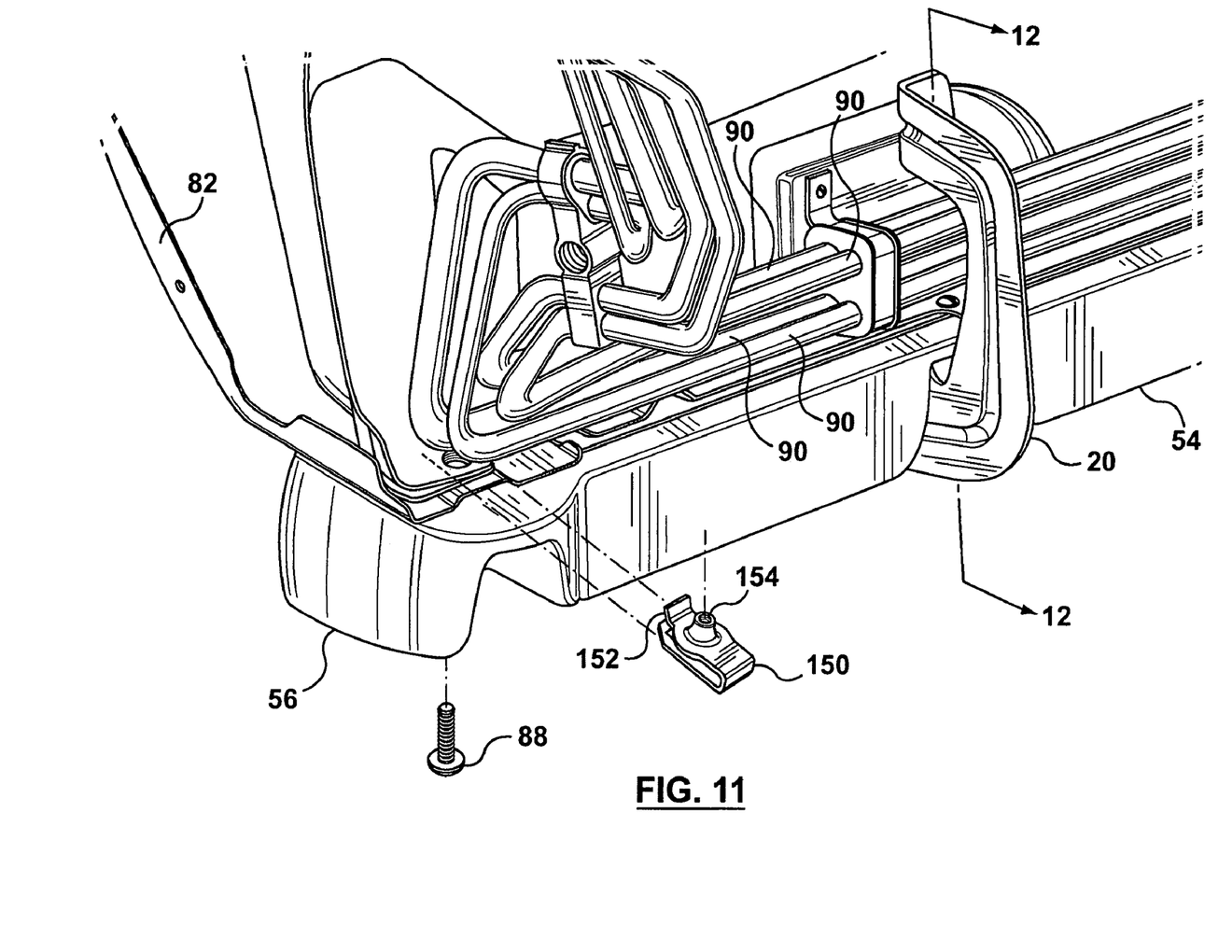
FIG. 11 is a perspective view of the assembled vehicle of FIG. 10d showing a portion of the assembly.
Figure 12:
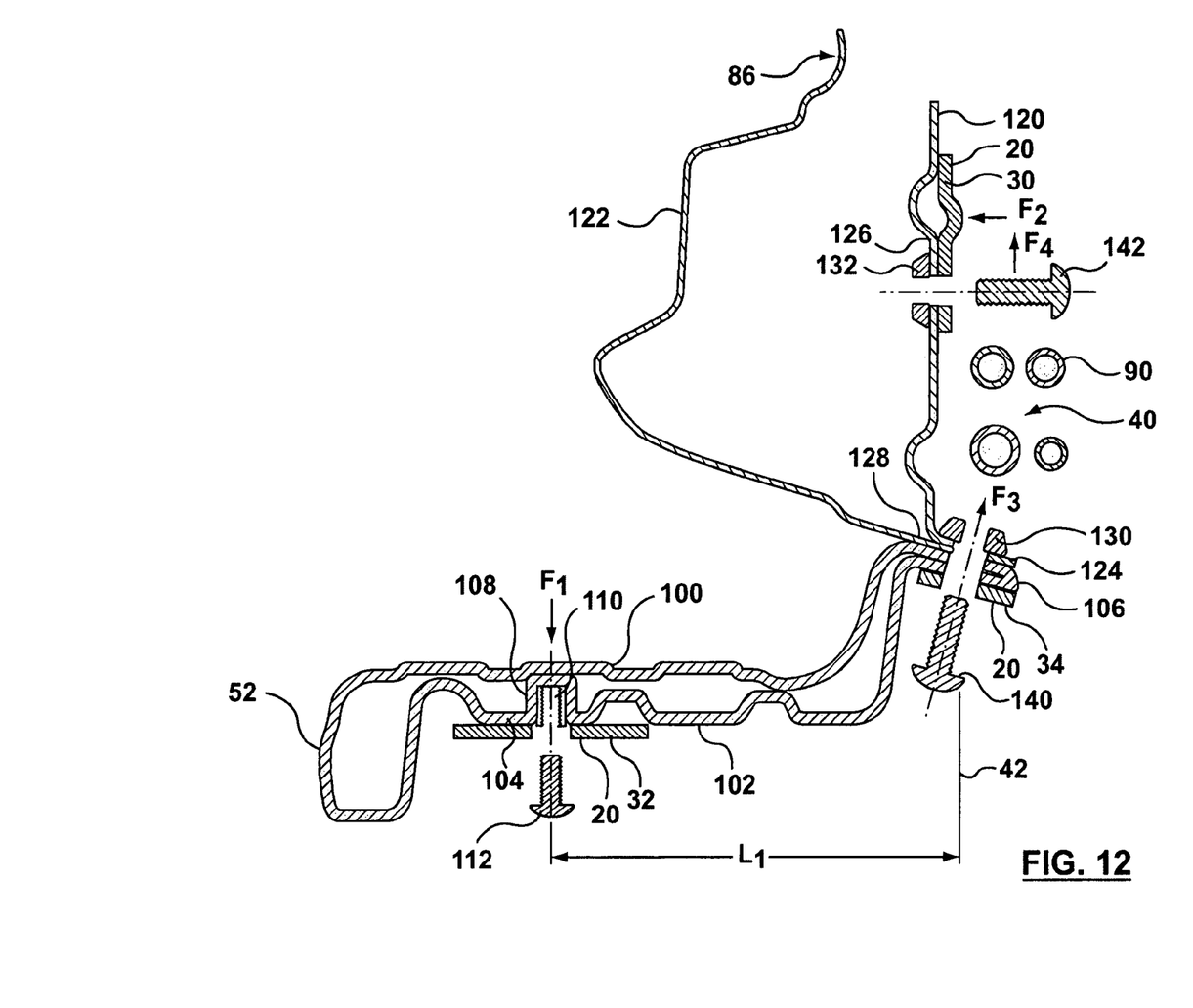
FIG. 12 is a cross-sectional view along the line 12—12 of FIG. 11.

Reference is now made to FIG. 11. FIG. 11 shows a portion of the vehicle 80 with the running board assembly 50 including the running board 52 and brackets 80 held in place by brackets 20. The vehicle includes a plurality of fluid lines shown at 90. The fluid lines 90 extend along the rocker panel of the vehicle 80 and may be used to convey fluids such as air conditioning fluids, or any other fluids typically used in a vehicle. In securing the running board to the vehicle, there is a need to ensure that the running board is secured and supported without obstructing or imposing any loads on the fluid lines 90. With respect to FIG. 11, it will be noted there is a section line 12—12 through one of the mounting holes of one bracket 20. With reference to FIG. 12, it will be observed how the bracket 20 attaches the running board assembly 50 to the vehicle 80 without interfering with the conduits 90.

The running board 52 includes a supporting surface 100 for supporting a vehicle occupant and a mounting surface 102. The mounting surface 102 includes a first running board mounting pad 104. The running board 52 also includes a second running board mounting pad 106. The mounting surface 102 of the running board 52 also defines a mounting receptacle 108. The mounting receptacle includes a metal insert 110.

The running board 52, including the central portion 54, and the two end caps 56, 58 may conveniently be manufactured in blow molding operations. Each piece is made individually and can be made from suitable parisons expanded in typical blow molding molds. The metal insert 110 includes self-tapping threads on the external surface. The external self-tapping threads cut their way into the mounting receptacle 108 so that the metal insert 110 is received permanently within the central portion 54 of the running board. The metal insert 110 includes internal threads for receiving a first fastener 112. Fastener 112 is conveniently in the form of a bolt with threads matching the internal threads of the metal insert 110. In order to create the assembly as shown in FIG. 5, four mounting brackets 20 are assembled to the central portion 54 of the running board 52. The brackets are assembled by placing the brackets in place as shown in FIG. 7. Once the brackets are in place, the fastener 112 is inserted through the second mounting flange 32, through the first running board mounting pad and into the metal insert 110. When the end caps 56 and 58 are positioned as previously explained, this then creates the assembly as shown in FIG. 5. As shown in FIG. 5, the end caps 56 and 58 are in the aligned position. However, the bolt 74 as shown in FIG. 8 is not installed to maintain the end caps in the aligned position until the assembly has been assembled to the truck body as discussed with reference to FIG. 10. However the snap fit of the axle 60 in the groove 62. The assembly may be done at the vehicle manufacturing plant or assembly by a supplier as a completed subassembly.

When it is desired to install the assembly 50 to the vehicle 80 this is done as shown in FIG. 12. The rocker panel assembly 86 of the vehicle 80 includes an inner rocker panel 120 and an outer rocker panel 122. The inner rocker panel 120 includes a first inner rocker panel mounting pad 124 and a second inner rocker panel mounting pad 126. The outer rocker panel 122 includes an outer rocker panel mounting pad 128.

When the inner rocker panel 120 is manufactured, it may conveniently be provided with a first pierce nut 130 at the first inner rocker panel mounting pad and a second pierce nut 132 at the second inner rocker panel mounting pad 126. The installation hardware includes a second bolt 140 and a third bolt 142 which are received in the first and second pierce nuts respectively.

By reference to FIG. 12, it will be noted that the third mounting flange 34 of the mounting bracket 20, the second running board mounting pad 106, the outer rocker panel mounting pad 128 and the first inner rocker panel mounting pad form a multi-layer sandwich. The second bolt 140 extends through this multi-layer sandwich and is received in the first pierce nut 130. Similarly, the second inner rocker panel mounting pad 126 is adjacent to and bears against the first mounting flange 30 of the mounting bracket 20. The third fastener 142 extends through the first mounting flange 30 and through the second inner rocker panel mounting pad 126 into the second pierce nut 132.

While the second and third bolts may be installed in any order, once the bolts are installed, they provide a unique mounting and support system for the running board 52. With respect to FIGS. 12 and 1, it will be noted that the open clearance area 40 designated by the point 40 in FIG. 12 locates the mounting bracket 20 surrounding the plurality of conduits 90. Thus, the mounting bracket 20 mounts the running board 52 to the rocker panel 86 of the truck 80 while not interfering with or applying any forces to, the plurality of conduits 90 that are within the open clearance area 40 of the bracket 20.

Also from reference to FIG. 12, it will be noted that the distance between the plane 42 of the first mounting flange 30 of the bracket 20 and the general area where the weight of an occupant stepping on the running board 52, designated by the arrow F1 in FIG. 2, is the distance $L_1$. The bracket 20 with its C-shaped portion and with its extension arm 26 is a generally L-shaped. The vertically downward force F1 representing the weight of an occupant boarding the vehicle is resisted by the tensile strength of the second bolt 140. Because of the lever arm $L_1$, the force F1, exerted on the running board and thus on the mounting brackets 20, would tend to twist the mounting bracket in the counterclockwise direction as shown in FIG. 12 about the multi-layer sandwich between second bolts 140 and the pierce nut 130. With this arrangement, the third bolt 142, which would be tightened and thus under tension, would actually be partially relieved from that tension as the first mounting flange 30 of the mounting bracket 20 attempts to move to the left in FIG. 12 and is restrained by the second rocker panel mounting pad 126. As shown in FIG. 12, the force F3 in the second bolt 140 can be vertically upward if the third mounting flange 34 and the associated components of the multi-layer sandwich are horizontal when installed. With a slight angle to vertical as shown, the bolt 140 is still stressed mainly in tension to carry the load, but there will, in addition, be some shear load in the second bolt 140.

Turning now to FIG. 11, there is shown the front end cap 56. As illustrated in FIG. 8, the fastener 74 can hold the end cap 56 in the aligned position relative to the central portion 54 of the running board 52. FIG. 11 however, illustrates the need for the end cap 56 which can move from the non-aligned position to the aligned position. Because of the design of the vehicle, there is intended to be a fastener between the vehicle front fender 82, the inner rocker panel 120 and the outer panel 122. In most cases, the running board will be assembled to the vehicle before the front fenders are assembled to the vehicle. Thus, if the front end cap 56 were in the aligned position, it would not be possible to make the required connection between the vehicle fender 82 and the rocker panel assembly. As shown in FIG. 11, a connector clip 150 can be slid from the inboard direction of the vehicle toward the outboard direction. The connector clip 150 includes a U-shaped opening 152 with a formed nut 154 on one side. The U-shaped opening 152 receives and surrounds the inner rocker panel 120, the outer rocker panel 122 and the vehicle fender 82. The formed nut of the connector clip 150 then aligns with a hole in the end cap 56. The fastener 88, as shown in FIG. 10c, may then be passed upwardly through the end cap 56 and into the retaining clip 150 so that the appropriate connection is made between the vehicle fender 82 and the rocker panel assembly 86 as well as additionally securing the end cap 56 in place with the end cap extending beyond the rocker panel assembly and along the fender as needed. This is also shown in FIGS. 10a through 10d.

The invention claimed is:

1. An assembly comprising:
 at least one bracket,
 a running board and
 a motor vehicle rocker panel,
 said bracket having first and second mounting flanges and a third mounting flange intermediate said first and second mounting flanges,
 said bracket comprising a substantially "C" shaped portion between said first and third mounting flanges said substantially "C" shaped portion defining an open clearance area,
 wherein said bracket is attached to said rocker panel at said first and third flanges and said bracket is attached to said running board at said second and third flanges.

2. The assembly of claim 1, said bracket comprising:
 a body,
 said body comprising said substantially "C" shaped portion.

3. The assembly of claim 2, said body further comprising, an extension arm between said third and second mounting flanges.

4. The assembly of claim 3, wherein said extension arm extends from said third mounting flange away from said open clearance area.

5. The assembly of claim 4, wherein said first and second mounting flanges are located in mutually substantially perpendicular planes.

6. The assembly of claim 5, said running board including a supporting surface and a mounting surface, said mounting surface including a first running board mounting pad and a mounting receptacle,
 and a first fastener,
 said first fastener extending through said second mounting flange of said bracket and into said mounting receptacle so that said second flange contacts said first running board mounting pad.

7. The assembly of claim 6 wherein said running board includes a second running board mounting pad and said third flange of said bracket contacts said second mounting pad.

8. The assembly of claim 7, said rocker panel including an inner rocker panel and an outer rocker panel.

9. The assembly of claim 8 wherein said inner rocker panel includes at least a first inner rocker mounting pad and said second running board mounting pad and said first inner rocker panel mounting pad are aligned to receive a second fastener.

10. The assembly of claim 9 wherein said outer rocker panel includes an outer rocker panel mounting pad and said outer rocker panel mounting pad is aligned with said second running board mounting pad to also receive said second fastener.

11. The assembly of claim 10 wherein said inner rocker panel includes a second inner rocker panel mounting pad and said second inner rocker panel mounting pad is aligned with said first bracket mounting flange to receive a third fastener.

12. The motor vehicle of claim 11 wherein said second and said third fasteners are bolts and said bolts are received within respective pierce nuts.

13. The assembly of claim 12 wherein said running board comprises a central potion and at least one end cap.

14. The assembly of claim 13 wherein said end cap includes a pivotal connection with respect to said central portion to permit pivotal movement between a non-aligned position and an aligned position.

15. The assembly of claim 14 wherein said central portion comprises a mounting axle and said end cap is attached to said mounting axle for said pivotal movement.

16. The assembly of claim 15 wherein said end cap includes a part circular mounting groove adapted to receive said axle.

17. The assembly of claim 16 wherein said groove comprises a recess of greater than 180° so that said axle may be received with said groove in a snap fit so that said end cap is retained on said central portion when in said non-aligned position.

18. The assembly of claim 17 wherein said at least one end cap is in the aligned position and at least one additional fastener extends through said end cap and into a structural portion of said vehicle to retain said end cap in the aligned position.

19. The assembly of claim 18 wherein the structural portion is a vehicle fender.

20. The assembly of claim 18 wherein the structural portion is said running board.

21. The assembly of claim 12 wherein said vehicle comprises a plurality of conduits for conveying fluids and said conduits extend along said running board and said conduits extend through said open clearance area of said bracket.

22. The vehicle of claim 21 wherein said vehicle includes a plurality of said brackets mounted to said vehicle and said running board.

23. An assembly comprising: a bracket, a running board, and a first bolt,
 said bracket comprising a body,
 said body having at least first and second mounting flanges and a third mounting flange located between said first and second mounting flanges, said body comprising a substantially "C" shaped portion between said first and third mounting flanges, said "C" shaped portion defining an open clearance area, said "C" shaped portion having a first laterally extending portion extending generally laterally away from said first flange, a downwardly extending portion extending generally downwardly from said first laterally extending portion and a second laterally extending portion extending laterally from said downwardly extending portion to said third mounting flange, said flanges and said "C" shaped portion located so that said "C" shaped portion is adjacent to said rocker panel when said bracket is mounted to said running board and said vehicle, said body further comprising, an extension arm between said third and second mounting flanges, and wherein said extension arm extends from said third mounting flange away from said open clearance area, and wherein said first and second mounting flanges are located in mutually substantially perpendicular planes,
 said running board including a supporting surface and a mounting surface, said mounting surface including a first running board mounting pad and a mounting receptacle,
 said first bolt extending through said second mounting flange of said bracket and into said mounting receptacle so that said second flange contacts said first running board mounting pad.

24. The assembly of claim 23 wherein said running board includes a second running board mounting pad and said third flange of said bracket contacts said second mounting pad.

25. An assembly comprising: a bracket, a running board and a first bolt, said bracket comprising a body, said body having at least first and second mounting flanges and a third mounting flange located between said first and second mounting flanges, said body comprising a substantially "C" shaped portion between said first and third mounting flanges, said "C" shaped portion defining an open clearance area, said body further comprising, an extension arm between said third and second mounting flanges, wherein said extension arm extends from said third mounting flange away from said open clearance area, and wherein said first and second mounting flanges are located in mutually substantially perpendicular planes, said running board including a supporting surface and a mounting surface, said mounting surface including a first running board mounting pad and a mounting receptacle, said first bolt extending through said second mounting flange of said bracket and into said mounting receptacle so that said second flange contacts said first running board mounting pad said running board includes a second running board mounting pad and said third flange of said bracket contacts said second mounting pad, said running board comprises a central portion and at least one end cap, said end cap includes a pivotal connection with respect to said central portion to permit pivotal movement between a non-aligned position and an aligned position, said central portion comprises a mounting axle and said end cap is attached to said mounting axle for said pivotal movement, and wherein said end cap includes a part circular mounting groove adapted to receive said axle.

26. The assembly of claim 25 wherein said groove comprises a recess of greater than 180° so that said axle may be received with said groove in a snap fit so that said end cap is retained on said central portion when in said non-aligned position.

27. A motor vehicle, said motor vehicle including a rocker panel, said rocker panel including an inner rocker panel and an outer rocker panel and an assembly in accordance with claim 26 affixed thereto.

28. The motor vehicle of claim 27 wherein said inner rocker panel includes at least a first inner rocker mounting pad and said second running board mounting pad and said first inner rocker panel mounting pad are aligned to receive a second bolt.

29. The motor vehicle of claim 28 wherein said outer rocker panel includes an outer rocker panel mounting pad and said outer rocker panel mounting pad is aligned with said second running board mounting pad to also receive said second bolt.

30. The motor vehicle of claim 29 wherein said inner rocker panel includes a second inner rocker panel mounting pad and said second inner rocker panel mounting pad is aligned with said first bracket mounting flange to receive a third bolt.

31. The motor vehicle of claim 30 wherein said second and said third bolts are received within respective pierce nuts.

32. The motor vehicle of claim 31 wherein said at least one end cap is in the aligned position and at least one additional fastener extends through said end cap and into a structural portion of said vehicle to retain said end cap in the aligned position.

33. The motor vehicle of claim 32 wherein the structural portion is a vehicle fender.

34. The motor vehicle of claim 32 wherein the structural portion is said running board.

35. The motor vehicle of claim 31 wherein said vehicle comprises a plurality of conduits for conveying fluids and said conduits extend along said running board and said conduits extend through said open clearance area of said bracket.

36. The vehicle of claim 35 wherein said vehicle includes a plurality of said brackets mounted to said vehicle and said running board.

* * * * *